DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 21, 1971

890 O.G. 981

T890,009

COATING COMPOSITIONS CONTAINING TITANIUM DIOXIDE FLUX-CALCINED DIATOMACEOUS EARTH AND A BUTADIENE/METHYL METHACRYLATE/METHACRYLIC ACID TERPOLYMER

Achim R. Krueger, Upper Darby, Pa., assignor to E. I. du Pont de Nemours and Company, Wilmington, Del.

Continuation of application Ser. No. 832,826, June 12, 1969, which is a continuation-in-part of application Ser. No. 539,321, Apr. 1, 1966. This application Oct. 21, 1970, Ser. No. 82,807

Int. Cl. C09d *5/02*

U.S. Cl. 260—29.7

No Drawing. 8 Pages Specification

A coating composition comprising water, a butadiene/methyl methacrylate/methacrylic acid terpolymer, and a pigment of (a) particulate flux-calcined diatomaceous earth, and (b) particulate rutile titanium dioxide.